July 7, 1925.
H. C. LORD
1,545,000
METHOD OF AND APPARATUS FOR DEHYDRATING MATERIAL
Filed Sept. 26, 1921
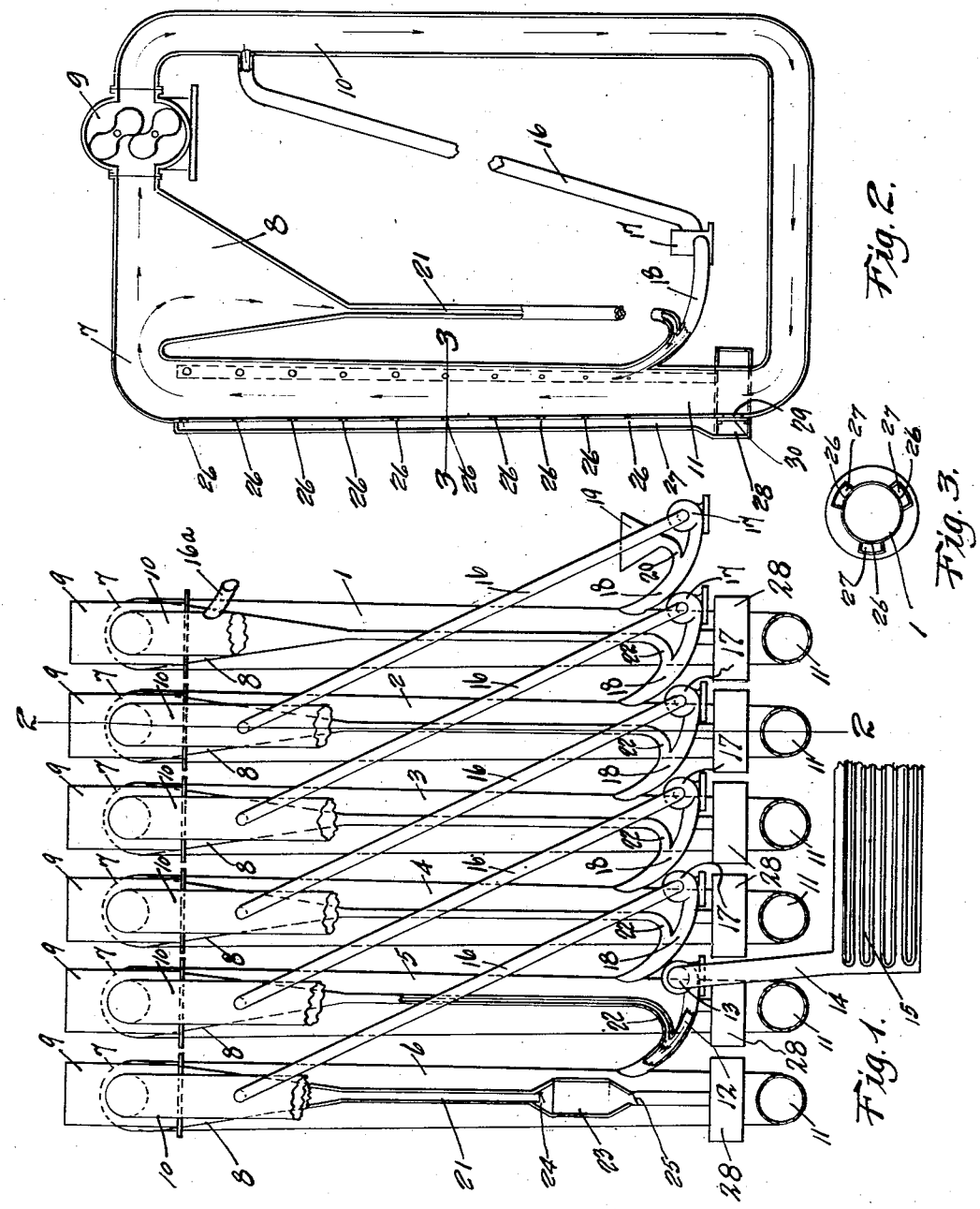

Patented July 7, 1925.

1,545,000

UNITED STATES PATENT OFFICE.

HUGH C. LORD, OF ERIE, PENNSYLVANIA.

METHOD OF AND APPARATUS FOR DEHYDRATING MATERIAL.

Application filed September 26, 1921. Serial No. 503,155.

*To all whom it may concern:*

Be it known that I, HUGH C. LORD, a citizen of the United States, residing at Erie, in the county of Erie and State of Pennsylvania, have invented new and useful Improvements in the Method of and Apparatus for Dehydrating Materials, of which the following is a specification.

This invention is designed to dehydrate materials particularly fruits and vegetables. As ordinarily carried out materials of this kind are placed on supports, usually trays arranged in banks and the dehydrating air forced through the material. The trays offer very material resistance to the passage of air. The treating and handling of the trays is a considerable item of expense and the obstruction offered by the tray to some surfaces of the supported material prevents the action of the air on these surfaces so that uneven product results. Further the dehydrating is carried to a point that is best for the average of the material supported on the tray. With some it is carried too far and some not quite far enough to get the best results.

With the present method and apparatus the material is sustained by the dehydrating blast, preferably varying in velocity so that the material changes its position as the dehydrating progresses and when the dehydrating is carried to a point reducing the weight to a pre-determined amount the particle reaching this condition is separated from the mass either with the dehydration completed or if necessary is subjected to a subsequent operation. In a broad sense this is accomplished by providing a vertical tunnel slightly larger at the top than at the bottom so as to decrease the velocity of the upgoing blast as it passes up the tunnel feeding the material to the tunnel and controlling the blast so that the heavier material remains at the bottom and gradually ascends as the dehydration progresses passing out of a trap on the completion of this operation. The material is graduated in its feeding so that the particles of the material, as for instance each prune where prunes are being dried, are isolated, one from another, the blast passing between them with its sustaining velocity. Ordinarily it will be preferable to pass the air through the material a plurality of times and this may be accomplished by passing the air in a circuit from the trap to the bottom of the tunnel feeding in and taking out a proportion of the air with each circuit so that on the average the air is passed through the tunnel the desired number of times. It may be desirable also to provide a series of tunnels passing the material in one direction from tunnel to tunnel and the air in the opposite direction from tunnel to tunnel so that the dry air is supplied to the outgoing material and the more nearly saturated air is applied to the incoming material.

The apparatus for carrying out the method and forming the subject matter of the invention is illustrated in the accompanying drawings as follows:—

Fig. 1 shows a side elevation of the apparatus, parts being broken away.

Fig. 2 is a section on the line 2—2 in Fig. 1.

Fig. 3 is a section on the line 3—3 in Fig. 2.

A series of tunnels 1, 2, 3, 4, 5 and 6 is provided. These are simply vertical tubes of quite extended length much longer comparatively than is shown in the drawings and are preferably formed of wood or insulated material. The air passes out of the tunnel through an elbow 7 and is delivered to an enlargement or trap 8. The air is drawn from the trap and consequently from the tunnel by a rotary pump 9. The air is returned through a pipe 10 to the bottom 11 of the tunnel. In order to deliver fresh air to the tunnel from which the material is finally delivered air is forced through a pipe 12 to the tunnel 6 near the bottom thereof by a pump 13, the pump getting its air through a pipe 14 from a heating system or coil 15.

An amount of air approximately equal to that delivered through the pipe 12 is taken through the pipe 16 from the pipe 10 communicating with the tunnel 6 and delivered to a pump 17, the pump 17 delivering its air through a pipe 18 to the next succeeding tunnel as 5 and each tunnel is provided with a similar pipe 16 leading to a pump 17 delivering air through a pipe 18 to the next succeeding tunnel. The amount of air delivered through the pipe 12 and the amount of air carried through the pipe 16 is regulated so as to determine the average number of times the air is returned through the material in the tunnel. If a greater proportion of the air is carried through the pipes 12 and 16 the air on the average will make a fewer number of circuits by way of the pipes 10. On the other hand if a smaller amount is delivered through the pipes 12 and 16 a greater number of circuits through the pipe 10 will follow. The only requirement in this is that the relation shall be such as to give to the air as it is finally exhausted such a degree of saturation as may be economical in the operation and also preferable in its initial action on the material being dehydrated. Air from the final tunnel is discharged through the pipe 16ª. The material to be dried is delivered to a funnel 19 and delivered through a pipe 20 of the incoming pipe 18 leading to the tunnel 1. The discharge of the pipe 20 to the pipe 18 is so directed with relation to the current in the pipe 18 that an ejector effect is produced on the pipe 20 which picks up the material delivered to the tunnel and projects it into the air current of the first tunnel where it is immediately floated by the upgoing blast. This blast as before stated is so tempered by regulating the speed of the pump 9 as to float the material on its initial entrance to the tunnel near the bottom of said tunnel. The tunnel is slightly flaring toward the top so that the velocity of the air is varied decreasing toward the top. Where the material to be dried is of constant quality this variation may remain fixed and further the material may be run through a greater number of tunnels thus making the movement through the tunnel more rapid. As the dehydrating progresses and becomes lighter it gradually rises at all times assuming a place in the tunnel having a velocity that will balance or sustain the material. Thus if there are particles that are dehydrated more rapidly than others these will pass through the tunnel more rapidly the final test of delivery being the dehydrated quality of the material rather than a given time. The point that the material assumes is made quite definite in that the sustaining power of the air does not vary directly as its velocity. The material finally reaches the top and is delivered to the trap 8. During its retention in the tunnel the material through the action of the air has its particles maintained largely out of contact with each other and with the walls and the material further is turned as the dehydrating progresses presenting the heavier or less dehydrated portion to the impact of the air. Immediately the material reaches the trap 8 it passes downwardly through a small pipe 21 just large enough to carry the material through a bend 22 corresponding to the pipe 20 to the next succeeding pipe 18 and delivered to the second tunnel. The draft through this second tunnel is sufficient to float the material near the bottom of the tunnel and inasmuch as the material has already had some dehydrating this draft will be less than that in the tunnel 1. The material is carried forward in a like manner from tunnel to tunnel as far as may be desired and finally delivered to the final trap. The pipe 21 of this trap leads to an air lock 23 provided with the valves 24 and 25, these valves closing under the suction in the lock and opening with the weight of the material to deliver the material through the lock in the well known manner of devices of this type.

It may be desirable to have the tunnel provided with means whereby the variation in velocity may be controlled so as to adapt it for differing materials. This may be accomplished by providing the tunnel with perforations 26, the size of these perforations gradually increasing from the bottom to the top. Conduits 27 lead from a manifold 28 at the bottom along the sides of the tunnel in position to deliver air to the perforations 26. The manifold 28 is circular and arranged around the pipe 11. Openings 29 lead from the pipe 10 to the manifold 28 and a valve 30 operates over the openings 29 so as to regulate the amount of air that may be bypassed through the conduits 27. Obviously whatever air is delivered above the bottom of the tunnel will reduce the relative velocity of the blast at the bottom because there will be comparatively less air delivered to the bottom under these conditions. It will be understood that the feeding action should not be rapid enough to at any time prevent a free flow of air past the material as this would choke the apparatus. The flow of air operating past the detached particles will readily float them where the same air pressures would not lift a mass of material.

While I have used "air" as the dehydrating fluid it will be understood that I wish to include in that term gases which may be utilized for this purpose.

What I claim as new is:—

1. The method of dehydrating materials which consists in subjecting the material to a series of sustaining blasts of air of different velocities.

2. The method of dehydrating materials which consists in subjecting the material to a series of sustaining blasts of air of different velocities and changing the velocity of each blast as it rises.

3. The method of dehydrating materials which consists in subjecting the material to a series of sustaining blasts of air of different velocities, permitting the material to rise in each blast as the dehydrating progresses, separating the dehydrated lighter materials from the mass sustained by the blast, and delivering the same to the blast next in series.

4. The method of dehydrating materials which consists in subjecting the material to a series of sustaining blasts of air of different velocities, and carrying the air from a blast later in the series to a blast earlier in the series.

5. The method of dehydrating materials which consists in subjecting the material to a series of sustaining blasts of air of different velocities, passing the air of said blasts in a circuit, taking a portion of the air from an earlier blast and delivering it to a later one of the series.

6. The method of dehydrating materials which consists in subjecting the material to a series of sustaining blasts of air of different velocities, passing the air of said blasts in a circuit, taking a portion of the air from an earlier blast and delivering it to a later one of the series, and changing the velocity of each blast as it rises.

7. The method of dehydrating materials which consists in subjecting the material to a series of sustaining blasts of air of different velocities, passing the air of said blasts in a circuit, taking a portion of the air from an earlier blast and delivering it to a later one of the series, changing the velocity of each blast as it rises, permitting the material to rise as the dehydration progresses, and separating the lighter materials from the mass sustained by one blast and delivering the same to the blast next in series.

8. The method of dehydrating materials which consists in subjecting the material to a series of sustaining blasts of air of different velocities, passing the air of said blasts in a circuit, taking a portion of the air from an earlier blast and delivering it to a later one of the series, changing the velocity of each blast as it rises, permitting the material to rise as the dehydration progresses, separating the lighter materials from the mass sustained by one blast and delivering the same to the blast next in series, and utilizing the air transferred as it is transferred from one circuit to another to transfer the material from one blast to another.

9. The method of dehydrating material which consists in subjecting the material to a series of sustaining blasts of different velocities, separating the material as the dehydrating progresses from the mass in each blast and delivering the material separated to an air jet leading to the next succeeding blast.

10. The method of feeding material to a sustaining blast of air which consists in projecting the material into an air current with a blast of air smaller in volume than the sustaining blast.

11. In an apparatus for dehydrating material, the combination of an upright tunnel; means for supplying a sustaining blast to the lower part of the tunnel; means for feeding material to the tunnel comprising a feeding tube; and means for driving air through the tube and for delivering material to the tube.

12. In an apparatus for dehydrating material, the combination of an upright tunnel; means for supplying a sustaining blast to the lower part of the tunnel; means for feeding material to the tunnel comprising a feeding tube; means for driving air through the tube; and a delivery tube leading to the feeding tube in a direction to subject the delivery tube to ejector effect from the air passing through the feeding tube.

13. In an apparatus for dehydrating material, the combination of an upright tunnel; means for supplying a sustaining blast of air to the lower portion of the tunnel; and means for varying the velocity of the air through the tunnel comprising conduits delivering air to different parts of the tunnel.

14. In an apparatus for dehydrating material, the combination of an upright tunnel; means for supplying a sustaining blast of air to the lower portion of the tunnel; means for varying the velocity of the air through the tunnel comprising conduits delivering air to different parts of the tunnel; and means for regulating the quantity of air through the conduits.

15. In an apparatus for dehydrating material, the combination of a series of tunnels; means for delivering a sustaining blast of air through each tunnel with a velocity decreasing with each tunnel; and means for transferring material from one tunnel to another.

16. In an apparatus for dehydrating material, the combination of a series of tunnels; means for delivering a sustaining blast of air to each tunnel with a velocity decreasing with each tunnel and comprising means for transferring the air from one tunnel to another, and means for transferring material from one tunnel to another.

17. In an apparatus for dehydrating material, the combination of a series of tunnels; means for driving a sustaining blast of air in circuit through said tunnels; means for transferring a portion of the air from one circuit to another; and means for transferring the material from one tunnel to another.

18. In an apparatus for dehydrating material, the combination of a series of tunnels; means for driving a sustaining blast of air in circuit through said tunnels; means for transferring a portion of the air from one circuit to another; and air operated means for transferring material from one tunnel to another.

19. In an apparatus for dehydrating material, the combination of a series of tunnels; means for passing a sustaining blast of air in circuit through each of said tunnels, said tunnels reducing the velocity of the air toward the upper part of the tunnel; means for transferring the air from a later tunnel in the series to an earlier tunnel; and means for transferring material from an earlier tunnel to a later tunnel in the series.

In testimony whereof I have hereunto set my hand.

HUGH C. LORD.